United States Patent
Miller et al.

(10) Patent No.: US 8,352,795 B2
(45) Date of Patent: Jan. 8, 2013

(54) HIGH INTEGRITY PROCESSOR MONITOR

(75) Inventors: Larry James Miller, Black Canyon City, AZ (US); Paul Adrian Fisher, Sun City West, AZ (US); Robert J. Quirk, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 458 days.

(21) Appl. No.: 12/369,101

(22) Filed: Feb. 11, 2009

(65) Prior Publication Data

US 2010/0205414 A1    Aug. 12, 2010

(51) Int. Cl.
*G06F 11/00* (2006.01)
(52) U.S. Cl. ......................................................... 714/37
(58) Field of Classification Search .................... 712/227
See application file for complete search history.

(56) References Cited

U.S. PATENT DOCUMENTS

| | | | | |
|---|---|---|---|---|
| 4,727,549 A | * | 2/1988 | Tulpule et al. ................. | 714/55 |
| 5,016,249 A | * | 5/1991 | Hurst et al. ..................... | 714/24 |
| 5,371,883 A | | 12/1994 | Gross et al. | |
| 5,416,783 A | * | 5/1995 | Broseghini et al. ........... | 714/728 |
| 5,953,530 A | | 9/1999 | Rishi et al. | |
| 5,978,936 A | * | 11/1999 | Chandra et al. ................. | 714/43 |
| 6,594,774 B1 | | 7/2003 | Chapman et al. | |
| 6,634,001 B2 | * | 10/2003 | Anderson et al. .......... | 714/38.13 |
| 6,718,489 B1 | | 4/2004 | Lee et al. | |
| 6,948,091 B2 | | 9/2005 | Bartels et al. | |
| 6,971,084 B2 | | 11/2005 | Grey et al. | |
| 7,243,043 B2 | | 7/2007 | Shin | |
| 2003/0061548 A1 | * | 3/2003 | O'Gorman et al. ............. | 714/43 |
| 2004/0128523 A1 | * | 7/2004 | Fujioka ......................... | 713/189 |
| 2007/0028217 A1 | * | 2/2007 | Mishra et al. ................. | 717/124 |
| 2009/0077387 A1 | * | 3/2009 | Craft ............................. | 713/187 |
| 2011/0041178 A1 | * | 2/2011 | Jakobsson et al. .............. | 726/22 |

* cited by examiner

*Primary Examiner* — Scott Baderman
*Assistant Examiner* — Neil Miles
(74) *Attorney, Agent, or Firm* — Fogg & Powers LLC

(57) ABSTRACT

A method of ensuring high integrity of a processor is provided. The method includes executing sets of sequential instructions, each execution being based on a unique initial value, generating a computed final value responsive to each execution of a set of sequential instructions, and sending computed values to a monitoring portion of a high integrity processor monitor system responsive to the generating for each execution of the set of sequential instructions. The execution of the sets of sequential instructions tests pertinent addressing modes, operand sizes, and instruction side-effects for each instruction tested in a monitored central processing unit.

20 Claims, 6 Drawing Sheets

HIGH INTEGRITY PROCESSOR MONITOR

BACKGROUND

Existing processor monitoring systems can implement watchdog timers (sometimes also called heartbeat monitors) to reset a system if a program, due to some hardware or software fault condition, neglects to regularly provide a service pulse to the "watchdog" timer. If the watchdog timer does not receive a service pulse within specific timing constraints, then the watchdog timer resets the system. While a conventional watchdog mechanism can catch gross problems with the processor, many subtle processor faults could go undetected. Examples of microprocessor faults likely to escape detection with a conventional watchdog mechanism would be arithmetic computation errors, logic instruction errors and even some branching errors. This means that while a conventional watchdog mechanism does provide some gross protection against hardware faults, it cannot provide a high level of assurance that the microprocessor is healthy.

Often, when outputs from a microprocessor are deemed to be highly safety critical, these outputs are checked by a monitor, running in separate hardware, to avoid a failure that would both cause an erroneous output and disable the monitor. This is an effective but potentially costly strategy, as the monitor function may be almost as complex as the function being monitored. It may also need most, if not all, of the inputs that the main processor needs, but they must be provided in a way that maintains the separation between the main channel and the monitor.

SUMMARY

The present application relates to a method of ensuring high integrity of a processor. The method includes executing sets of sequential instructions, each execution being based on a unique initial value, generating a computed final value responsive to each execution of a set of sequential instructions, and sending computed values to a monitoring portion of a high integrity processor monitor system responsive to the generating for each execution of the set of sequential instructions. The execution of the sets of sequential instructions tests pertinent addressing modes, operand sizes, and instruction side-effects for each instruction tested in a monitored central processing unit.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

The method described herein ensures a level of processor integrity that is higher than the level of processor integrity that a traditional watchdog mechanism can provide without the high expense of monitoring by an additional microprocessor. A comprehensive processor test is executed on the monitored device in such a way that a series of unique computed values are produced and checked by simple PLD-based logic or ASIC-based logic. The processor test is comprehensive in nature and written such that the execution of each variation of each tested instruction contributes to the value of the required sequential values expected by the monitoring device. The method entails executing a set of sequential instructions a plurality of times. Each execution of the set of sequential instructions is based on a unique initial value, thus each execution of the set of sequential instructions produces a unique single result based on the unique initial value. After the set of sequential instructions is run starting with a first unique initial value, the set of sequential instructions is run starting with a second unique initial value, so the sets of sequential instructions are executed sequentially. Each set of sequential instructions exercises pertinent addressing modes, operands, and side-effects in a monitored central processing unit, based on a unique initial value. A computed value is generated with each execution of the sets of sequential instructions. A respective sequence of the plurality of computed values is sent to a monitoring portion of a high integrity processor monitor system responsive to the generating. Each of the computed values is written in addresses in the hardware portion of a high-integrity-processor monitor system. The high-integrity-processor monitor system determines if the sequence of the plurality of computed values includes correct computed values in a correct order.

In one implementation of this embodiment, the high-integrity-processor monitor system determines if the sequence of the plurality of computed values includes correct computed values in a correct order and within proper timing constraints. In another implementation of this embodiment, several different sequences of instructions are executed to keep the execution time for each sequence down. In yet another implementation of this embodiment, coverage for various data patterns on one instruction is obtained by repeating that instruction with different data in the same sequence.

Figure 1:
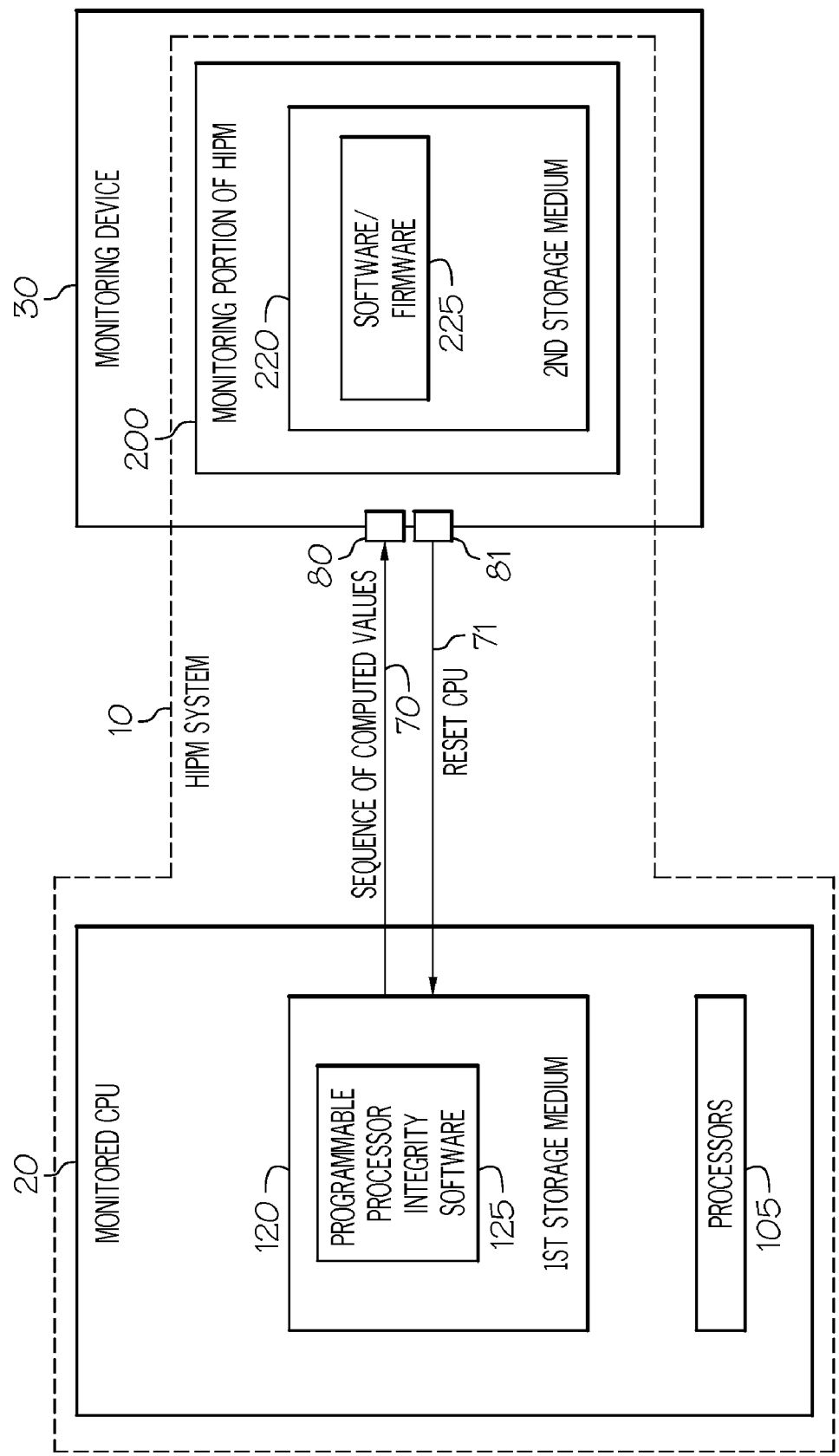
FIG. 1 is a block diagram of an embodiment of a high-integrity-processor monitor system in accordance with the present invention.

FIG. 1 is a block diagram of an embodiment of high-integrity-processor monitor (HIPM) system 10 in accordance with the present invention. The high-integrity-processor monitor system 10 includes a monitored central processing unit (CPU) 20 communicatively coupled to a monitoring portion 200 of the high-integrity-processor monitor system 10 via the device ports 80 and 81. The monitoring portion 200 is shown in FIG. 1 as the "monitoring portion of HIPM 200." The monitoring portion 200 is part of a monitoring device 30. The monitoring device 30 can handle other processes in addition to the monitoring process. The high-integrity-processor monitor system 10 is also referred to herein as "monitoring system 10."

The monitored central processing unit 20 includes programmable processor integrity software 125 stored in a first storage medium 120 and at least one processor 105. When the processor 105 is monitored by the high-integrity-processor monitor system 10, processor 105 operates with a high level of integrity and is thus, a high-integrity processor 105. Likewise, the monitored central processing unit 20 is referred to as a high-integrity processor 20 since the processors integral to the monitored central processing unit 20 are monitored by the high-integrity-processor monitor system 10 and therefore operate with a high level of integrity.

The monitoring portion 200 includes software/firmware 225 stored in a second storage medium 220. The programmable processor integrity software 125 is configured to sequentially execute sets of sequential instructions (also referred to herein as sets of instructions) in order to exercise the monitored central processing unit 20. A representative selection of addressing modes and operands of each tested instruction are exercised and instruction side-effects are checked as well. The side-effects include exceptions (such as, overflows) and flag register values. Each execution of a set of sequential instructions is based on a unique initial value and each execution generates a computed final value.

An execution of a set of sequential instructions tests pertinent addressing modes, operand sizes, and instruction side-effects for each instruction tested. As defined herein, "testing pertinent addressing modes and operand sizes," is the exercising of instructions, each of which may have numerous variations that include differing addressing modes (immediate, register to memory, memory to register addressing modes) and operand sizes (byte, word, Dword). As defined herein, "pertinent addressing modes and operand" are all those modes and operands in the critical software used by the monitored CPU 20. As defined herein "testing instruction side-effects" includes checking for flag register values, and exceptions, etc. The same instructions are run in sequence, so the same addressing modes and operands of each tested instruction are tested for each instruction each time the instructions are run. The data values being passed from instruction to instruction differ depending on the initial seed value. In this manner, data sensitivities (e.g., a stuck bit in a register) are detected. The terms "initial value," "seed value," and "test seed value" are used interchangeably herein.

The sets of instructions are included in the programmable processor integrity software 125 and at least one processor 105 is operable to execute the programmable processor integrity software 125. Each instruction execution within a set of instructions contributes to computing the final value. Some instructions may be executed a plurality of times within a set of instructions. A sequence of computed final values is generated by a respective sequential execution of sets of instructions in the programmable processor integrity software 125. A communication link 70, such as a memory mapped register interface, parallel or serial bus, a trace line, or a wired cable (optical or electrical), is used to send the sequence of computed values to the monitoring portion 200 of the high-integrity-processor monitor system 10 via the device port 80 or a bus. The monitoring portion 200 sends instructions to reset the monitored CPU 20 via device port 81 and communication link 71, such as a memory mapped register interface, a trace line or a wired cable (optical or electrical). As defined herein device ports 80 and 81 can be: registers in a central processing unit; ports to two or more processors and/or central processing units on a board; a serial port to one or more processors on a board; a serial port to one or more central processing units; ports in one or more programmable logic devices (PLDs); or a bus. If the ports are connected to two or more processors, then the communication link 70 will carry a port number and/or address along with the sequence of computed final values.

If the monitored CPU 20 is determined to generate an incorrect final value, the monitored CPU 20 is reset and it is not used in the operation of the system. In one implementation of this embodiment, if the monitored CPU 20 is determined to generate an incorrect final value again after the reset, the monitored CPU 20 is not used in the operation of the system until the failing CPU is changed out or repaired, since the monitored CPU 20 is continually reset if it can't muster correct values to send to the monitoring processor. Thus, all functions on the defective monitored CPU 20 become unavailable. In other implementations of this embodiment, if the monitored CPU 20 is determined to generate an incorrect final value, a warning is sent to the operator, the monitored CPU 20 is repeatedly reset, or the monitored CPU 20 is locked-out. Each of these embodiments can be coupled with various degrees of de-bounce to accommodate momentary upsets that may occur that do not represent a failure of the monitored CPU 20.

The monitoring portion 200 expects a sequence of specific values from the monitored CPU 20. The sequence of computed values is received for analysis at the software/firmware 225 in the monitoring portion 200 of the monitoring device 30. The software/firmware 200 is configured to: sequentially receive a plurality of computed values from the monitored CPU 20 via communication link 70; to determine if correct computed values were received in a correct order. In one implementation of this embodiment, the software/firmware 200 is configured to determine if each sequentially received computed value is received within an allotted time frame. In another implementation of this embodiment, the software/firmware 200 is not configured to determine if each sequentially received computed value is received within an allotted time frame. In embodiments of this case, a separate watchdog time is strobed at a specific rate that is dictated by a separate set of software instructions.

If the monitoring portion 200 determines that 1) an incorrect computed value was received in the correct order, 2) correct computed values were received in an incorrect order, 3) incorrect computed values were received in the incorrect order, or 4) the correct computed values were received in the correct order outside of the allotted time frame, then the monitoring portion 200 responds. For a response, monitoring portion 200: sends instructions to reset the monitored CPU 20 via communication link 71; 2) sends a warning via communication link 71; or 3) replaces the failed CPU 20 with redundant hardware.

The allotted time frame is a range of time that is measured with respect to a start time or that is relative to the last value received. The monitoring device has its own time-base and can independently determine if the latest port write is on time or not. This advantageously provides protection against a skewed time-base in monitored device in which a skewed input clock causes the device to run at half or double speed. In one implementation of this embodiment, the monitored CPU 20 uses a time-base that is independent of the monitoring system 10. In this embodiment, an initial-maximum-time-from-reset is defined for the first write and a predefined timeframe, which spans a minimum time from the last write and a maximum time from the last write, is defined for the succeeding writes. For example, the first write occurs within a first selected time (such as one second) and each subsequent write occurs within a selected range of time (such as 5 ms to 100 ms) after the previous write. In another implementation of this embodiment, the start time is known in the monitoring portion 200 of the monitoring system 10. In yet another implementation of this embodiment, the start time is based on synchronized clocks in the monitored CPU 20 and the monitoring portion 200. In one embodiment of such a case, the synchronized clocks are reset to zero at the start of each execution of the sets of sequential instructions. Other types of clocks systems to determine if each correct computed value was received within the allotted time frame are possible.

The monitoring portion 200 of the high-integrity-processor monitor system 10 can be one or more central processing units, one or more application specific integrated circuits (ASICs), or one or more programmable logic devices (PLDs). The monitored central processing unit 20 can be one or more CPUs, one or more ASICs, or one or more PLDs. In one implementation of this embodiment the CPU 20 is a multi-core processor including multiple CPUs in one processor package. In this case, each CPU executes the programmable processor integrity software 126 and sends the results to the monitoring portion 201. A programmable logic device (PLD) is also referred to herein as a "field programmable gate array (FPGA)."

The high-integrity-processor monitor system 10 provides a low cost method to test both software and hardware in critical instruments, equipment, processors, and computers in safety-critical systems. For example, the high-integrity-processor monitor system 10 can be used in aircraft systems, systems to monitor nuclear power plants, medical instrumentation and/or devices, and other safety-critical equipment.

Figure 2:
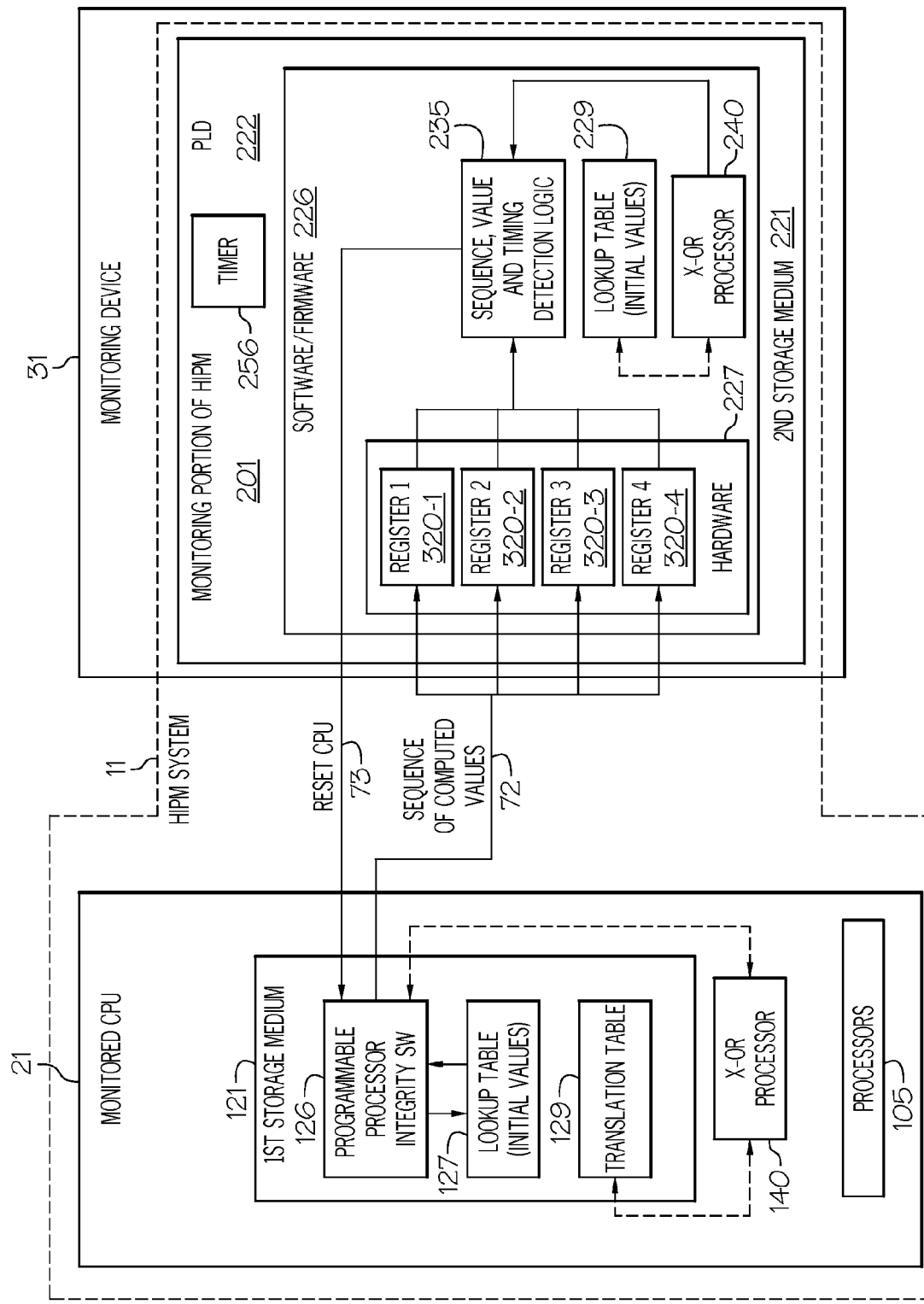
FIG. 2 is a block diagram of an embodiment of a high-integrity-processor monitor system in accordance with the present invention.

FIG. 2 shows a block diagram of an embodiment of a high-integrity-processor monitor system 11 that includes a monitored central processing unit (CPU) 21 communicatively coupled to a monitoring portion 201 of the high-integrity-processor monitor system 11 in accordance with the present invention. The monitoring portion 201 of the high-integrity-processor monitor 201 is shown as the "monitoring portion of the HIPM 201" in FIG. 2. The high-integrity-processor monitor system 11 is also referred to herein as "monitoring system 11."

The monitoring portion 201 is integral to a monitoring device 31. The monitored CPU 21 and the monitoring device 31 are implemented in a system or in equipment to be monitored, such as a safety-critical system or safety-critical equipment. The monitored CPU 21 includes at least one processor 105.

As shown in FIG. 2, the monitored CPU 21 includes programmable processor integrity software 126, and at least one lookup table 127 for initial values, which are stored in a first storage medium 121. The lookup table 127 for initial values includes a set of initial values. The lookup table 127 is also referred to herein as "initial value lookup table." The programmable processor integrity software 126 is configured to execute sets of sequential instructions a plurality of times in order to exercise pertinent addressing modes, operand sizes, and instruction side-effects for each instruction in a monitored central processing unit as described above with reference to programmable processor integrity software 126 in FIG. 1. The sequential instructions are included in the programmable processor integrity software 126. The processor 105 is operable to repeatedly execute at least a portion of the sequential instructions in the programmable processor integrity software 126 in the monitored CPU 20. The set of sequential instructions that is executed in each execution is based on the initial value. In one implementation of this embodiment, the monitored CPU 21 does not include a lookup table 127 and the initial value is determined by the previous execution of the sequential instructions in the programmable processor integrity software 126. In this case, there is an initial "computed value" or "seed value" that is used to start the repeated executions of the sequential instructions.

In another implementation of this embodiment, the entire set of instructions is executed, with each execution starting with a different seed value. This embodiment allows for testing the same instructions with different data values. In another implementation of this embodiment, if the test is too large to execute in its entirety without taking too long or by taking too much central processing unit time, the test is divided into N subsets and a computed value is generated for each of the N subsets before starting back over with the first subset. In either case, an initial value is used at start of each subset in order to get a predictable result.

The monitored CPU 21 as shown in FIG. 2 includes a translation table 129, which is stored in a first storage medium 121. The translation table 129 includes a list of conversion values (also referred to herein as translation values) that are used to adapt the HIPM system 11 after the software or testing is upgraded. There is a translation value for each unique initial value. The value from the translation table 129 is implemented with the X-OR processor 140 to convert a correctly computed value to the value the monitoring portion 201 is expecting. The X-OR processor 140 generates a resulting-computed value from a final computed value based on the translation value.

For example, after a software upgrade, the value the monitoring portion 201 is expecting is no longer the correctly computed value, since the set of instructions that generated the computed value for a given initial value has been changed by the software upgrade. The translation table 129 is upgraded and implemented. In this manner, the monitoring portion 201 does not need to be updated each time the CPU test (i.e., programmable processor integrity software 126) is updated. Instead, when a new instruction is added to the CPU test and the sets of sequential instructions generate a completely different final computed value, the values in the translation table are installed to adjust the final computed value to match the expected computed value expected at the monitoring portion 201 by an exclusive-OR process. In an exemplary case, the monitoring portion 201 is expecting '11111111' as the first value in the sequence of computed values, and the result of the CPU test using the initial value is "EEEEEEEE," so a conversion value of 'FFFFFFFF' from the translation table 129 is XOR'd with the computed result "EEEEEEEE" to yield the value the monitored device is expecting, i.e., '11111111'. If no correction is required, the value is X-ORed with all zeros to leave it the value unchanged.

In one implementation of this embodiment, the X-OR is a final step in the test sequence and is not a separate piece of hardware. In another implementation of this embodiment, there is no translation table 129 for correct values in the monitored CPU 21 and no exclusive-OR processor 140 in the monitored CPU 21.

The monitoring portion 201 includes a timer 256, the software/firmware 226 that is stored in a second storage medium 221. The software/firmware 226 includes a plurality of registers 320(1-N), a sequence-value-timing detection logic 235, a lookup table 229 for correct values and a comparison (X-OR) processor 240. The plurality of registers 320(1-N) form at least a portion of the hardware 227 in the monitoring portion 201. Each register 320(1-N) has an address. The terms "registers 320(1-N)," "addresses 320(1-N)," and "ports 320 (1-N)" are used interchangeably herein. In one implementation of this embodiment, the monitoring portion 201 is a central processing unit and the hardware 227 and/or the software/firmware 226 in the monitoring portion 201 receive the computed values. The link 72 is a branched link, such as a memory mapped register interface, a trace line, or cables used to send each of the computed values to be written in a respective one of the registers 320(1-N) in the monitoring portion 201 of the high-integrity-processor monitor system 11. The term "computed value" is used interchangeably with the terms "final computed result," "final computed value," and "resulting-computed value" to indicate the value received at the monitoring portion 201.

The software/firmware 226 is configured to receive a plurality of computed values from the monitored CPU 21 and to determine if correct computed values are received in a correct order. In embodiments, the software/firmware 226 is also configured to determine if correct computed values are written to a correct register 320(1-N) in the correct order within an allotted time frame as described above with reference to FIG. 1.

The monitoring portion 201 expects a sequence of specific values from the monitored CPU 21. The sequence of computed values are received at the software/firmware 226 in the monitoring portion 201 of the monitoring device 31 for analysis via at least one port (such as register 320-1) in the monitoring portion 201.

In one implementation of this embodiment, each sequentially received computed value is written to a respective one of the registers 320(1-N) and the sequence-value-timing detection logic 235 implements the comparison processor 240 and the lookup table 229 of correct values to determine if the monitored CPU 21 is operating in an error-free manner. By comparing each of the computed values with a respective lookup table entry it is determined if each of the computed values correlates with the respective lookup table entry.

If the sequence-value-timing detection logic 235 in the monitoring portion 201 determines that 1) an incorrect computed value was received in the correct order, 2) correct computed values were received in an incorrect order, 3) incorrect computed values were received in the incorrect order, or 4) the correct computed values were received in the correct order outside of the allotted time frame, then the monitoring portion 201 sends instructions to reset the monitored CPU 21 via link 73.

The monitoring portion 201 of the high-integrity-processor monitor system 11 can be a central processing unit, an ASIC, or a PLD. For example, the monitoring portion 201 as shown in FIG. 2 is a PLD 222.

If the monitored CPU 21 receives instructions to reset, then once it is reset the operation of the monitored CPU 21 begins again. If there is a soft error (i.e., a single event upset) then the monitored CPU 21 operates normally after the CPU reset. In the event that there is a hard error (i.e., something is wrong with the chip) then the implementation of the high-integrity-processor monitor system 11 ensures the user is not using a failed central processing unit (software and/or hardware). In this manner, misleading information is not given to a user of the monitored CPU 21.

Figure 3:
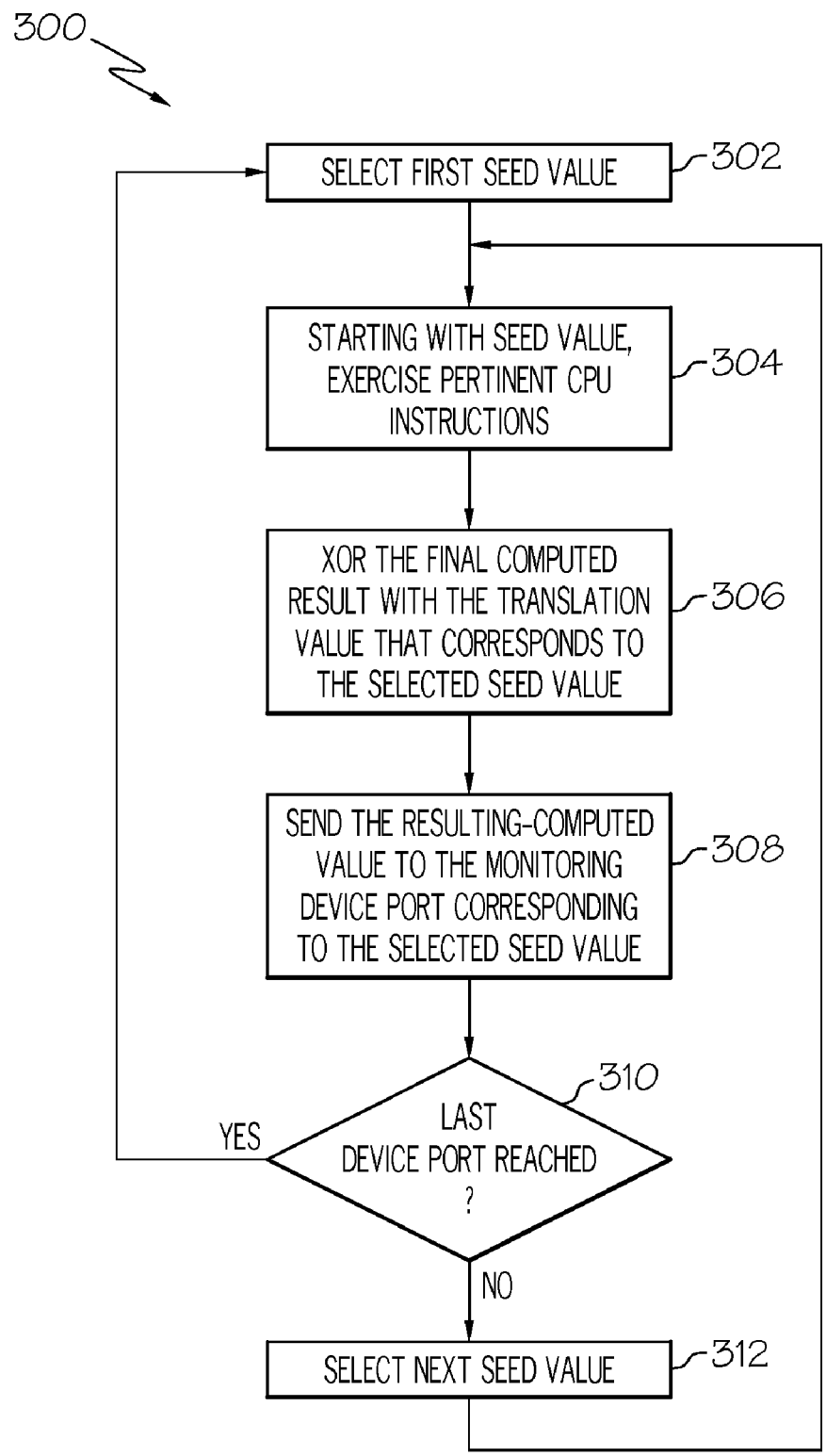
FIGS. 3-5 are flow diagrams of embodiments of methods of monitoring a high-integrity processor in accordance with the present invention.
Figure 4:
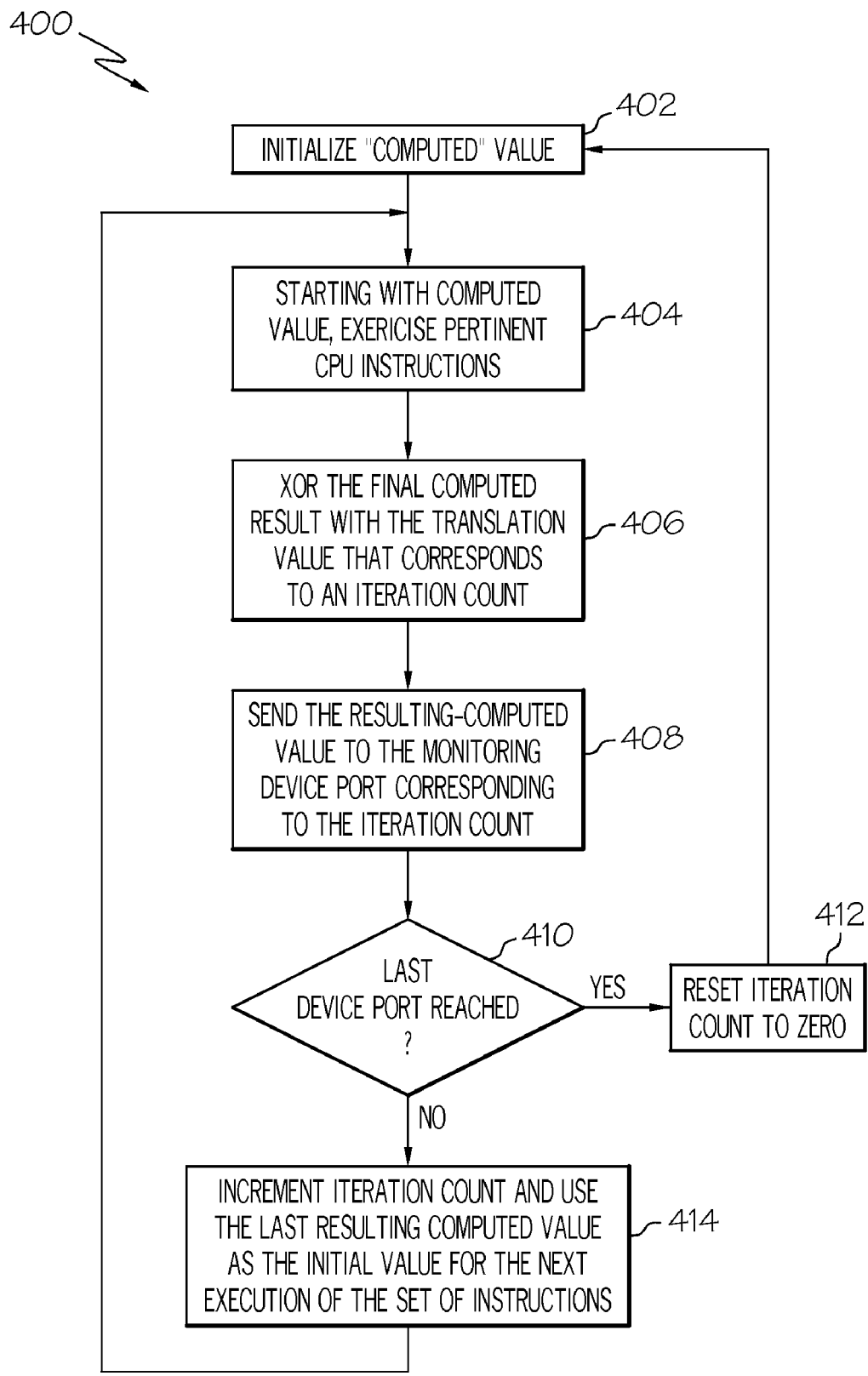
Figure 5:
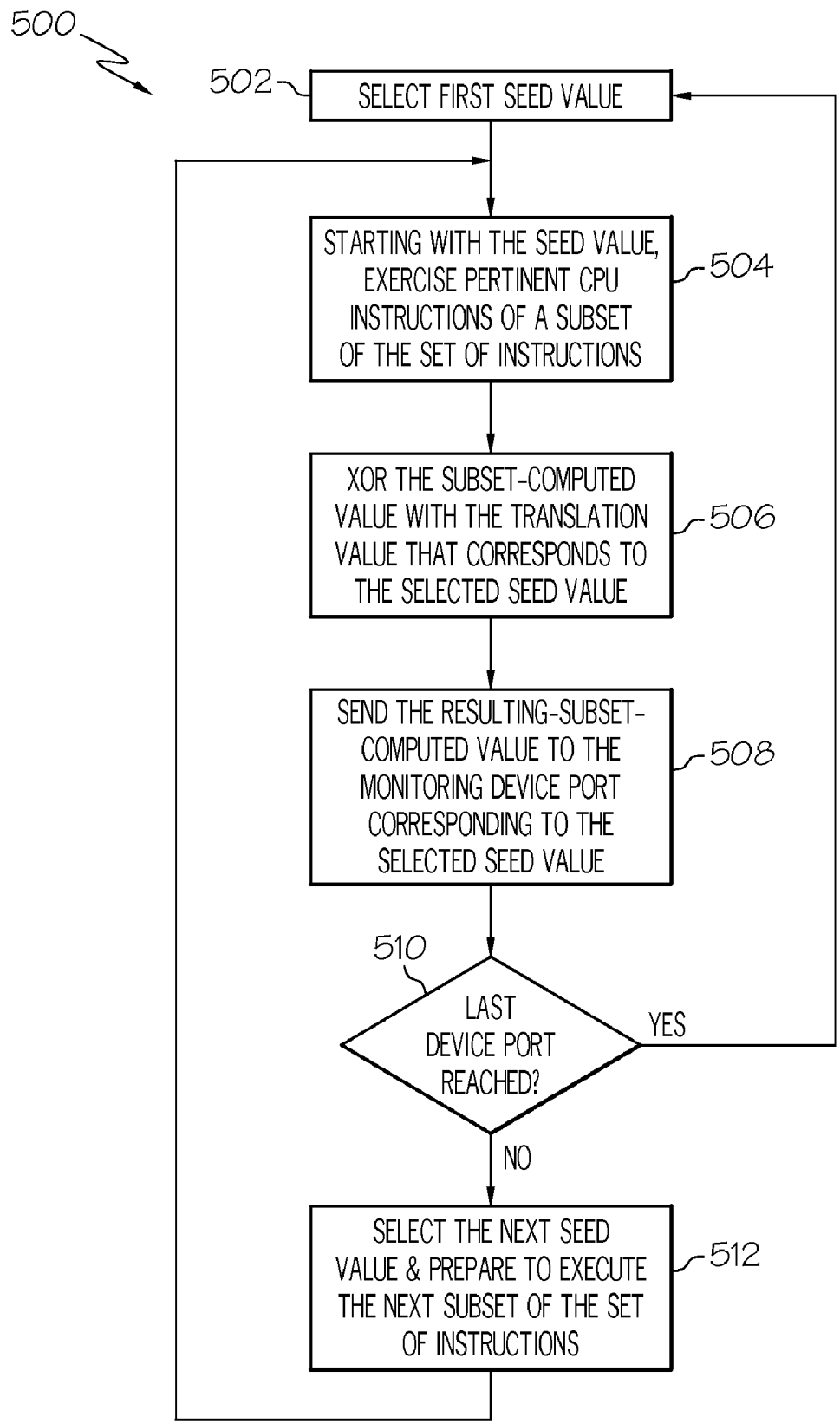

FIGS. 3-5 are flow diagrams of embodiments of methods 300, 400 and 500, respectively, of monitoring a processor in accordance with the present invention. The methods 300, 400 and 500 are described with reference to the high-integrity-processor monitor system 11 described above with reference to FIG. 2, although it is to be understood that methods 300, 400 and 500 can be implemented using other embodiments of the high-integrity-processor monitor system as is understandable by one skilled in the art who reads this document. The methods 300, 400 and 500 describe three exemplary ways for the monitored CPU 20 to monitor the heath of a processor with a high level of integrity.

In one implementation of this embodiment described with reference to method 300 of FIG. 3, each execution of the set of sequential instructions is run based on a different (preselected) seed value being used at the start of each execution of the programmable processor integrity software 126 by the processor 105. A first seed value (initial value) is selected to be used in a first run of the set of sequential instructions (block 302). The programmable processor integrity software 126 selects a first initial value from the set of initial values in the initial value lookup table 127. The pertinent addressing modes and operands in a monitored central processing unit 21 are exercised based on the unique first seed value (block 304). For example, at least one processor 105 in the monitored CPU 21 executes the set of sequential instructions in the programmable processor integrity software 126 based on the first seed value. A final computed value is generated responsive to the execution of the set of sequential instructions. Starting with the seed value, all pertinent CPU instructions are exercised utilizing multiple instruction variants, testing all applicable addressing modes, operand sizes, and side-effects (such as flags). Each tested instruction independently affects the computed value carried forward from instruction to instruction.

The final computed value (result) is X-ORed with a translation value that corresponds with the selected seed value (block 306), which, for the first execution of the set of sequential instructions, is the first seed value. If the final computed value was a correctly computed value, the process of X-ORing the final computed value with the translation value that corresponds with the selected seed value generates a resulting-computed value, which the monitoring portion 201 is expecting. Thus, the output from the X-ORing of the final computed value with a translation value is defined herein as a resulting-computed value.

If the final computed value was an incorrectly computed value, the process of X-ORing the final computed value with translation value generates a resulting-computed value, which the monitoring portion 201 recognizes as being incorrect. In one implementation of this embodiment, block 306 does not occur and the final computed value is sent to the monitoring portion 201 and the flow proceeds to block 310. In this case, any upgrade of the programmable processor integrity software 126 requires an upgrade of the lookup table 229 in the software/firmware 226.

The resulting-computed value is sent to a monitoring device port (i.e., $i^{th}$ port 320-$i$ of the monitoring portion 201 of the monitoring device 31) that corresponds to the selected seed value (block 308). In this manner, as the monitoring system 11 loops through iterations of this method 300, each computed value is sequentially written in addresses 320 in the hardware portion 227 of the high-integrity-processor monitor system as is described in detail below with reference to method 600 of FIG. 6.

The monitored CPU 21 determines if the last device port has been reached (block 310). When the last device port is reached, one test of the monitored CPU 21 is complete. The flow of method 300 proceeds to block 302 and the process of method 300 is repeated at the monitored CPU 21 of the monitoring system 11. If the last device port has not been reached, the flow of method 300 proceeds to block 312. The next seed value (initial value) is selected from the lookup table 127 (block 312). The programmable processor integrity software 126 selects a next initial value from the set of initial values in the initial value lookup table 127. The flow proceeds to block 304 and starting with the second seed value (or the next seed value) the flow cycles through blocks 304 to 312 until the last device port is reached and then the flow goes back to block 302. In some embodiments, the monitoring system 11 waits for a predetermined time before returning from block 310 to block 302. In some embodiments, the monitoring system 11 waits for a predetermined time before proceeding from block 310 to block 312. The monitored CPU 21 follows the first execution of the set of sequential instructions with sequential executions of the set of sequential instructions that each use a different seed value thereby executing a set of sequential instructions a plurality of times.

In this manner, the monitored CPU 20 selects a first initial value from a set of initial values in a lookup table, executes a set of sequential instructions a first time based on the first initial value to generate a final computed result and either: 1) sends the final computed result to the monitoring portion; or 2) X-ORs the final computed result with a translation value in a translation table 129 that corresponds to the first initial value to generate a resulting-computed value and sends the resulting-computed value to the monitoring portion. The monitored CPU 20 then selects a next initial value from the set of initial values in the lookup table, and executes a set of sequential instructions a second (next) time based the final computed result to generate a second (next) final computed result and either: 1) sends the second (next) final computed result to the monitoring portion; or 2) X-ORs the second (next) final computed result with a translation value in the translation table 129 that corresponds to the second (next) initial value to generate a second (next) resulting-computed value, and then sends the second (next) resulting-computed value to the monitoring portion 201. The monitored CPU 20 repeats this process until a last device port is reached and then begins a new execution of the sets of sequential instructions.

Another embodiment of a method of monitoring a high-integrity processor is described with reference to method 400 of FIG. 4. In this embodiment, the output from each execution of the sets of sequential instructions is applied as an input to the next execution of the sequential instructions. An initial computed value (typically obtained from a memory (not shown) in the monitored CPU 20) is used as the initial seed value for the first execution of the set of sequential instructions (block 402). In one implementation of this embodiment, the number of iterations of the sets of sequential instructions is controlled by counting the iterations. A counter (not shown) in the monitored CPU 20 is implemented to track the iterations. Starting with the initial computed value, all pertinent CPU instructions are exercised for the first execution of a set of sequential instructions (block 404). A final computed value is generated responsive to the execution of the set of sequential instructions. The final computed value (result) is X-ORed with a translation value that corresponds with the iteration count (block 406), which, for the first execution of the set of sequential instructions, is the first iteration. In one implementation of this embodiment, block 406 does not occur and the final computed value is sent to the monitoring portion 201 and the flow proceeds to block 410.

The resulting-computed value is sent to the monitoring device port ($i^{th}$ port 320-$i$ of the monitoring portion 201 of the monitoring device 31) that corresponds to the iteration count (block 408). In this manner, as the monitoring system 11 loops through iterations of this method 400, each resulting-computed value is sequentially written in addresses 320 in the hardware portion 227 and/or the software/firmware 226 of the high-integrity-processor monitor system as is described in detail below with reference to method 600 of FIG. 6.

The monitored CPU 21 determines if the last device port has been reached (block 410). When the last device port is reached, one test of the monitored CPU 21 (including the processor 105) is complete. When the last device port is reached, the flow of method 400 proceeds to block 412 and the iteration count is reset to zero. Then the flow of method 400 proceeds to block 402 and the process of method 400 is repeated at the monitored CPU 21 of the monitoring system 11. If the last device port has not been reached, the flow of method 400 proceeds to block 414. The iteration count is incremented and the last computed value (e.g., the last resulting-computed value) is set as the initial computed value (initial value) for the next execution (block 414). The flow proceeds to block 404 and starting with the second computed value (or the next computed value) the flow cycles through blocks 404 to 414 until the last device port (e.g., register 320-4, the last of registers 320(1-4)) is reached and then the flow goes back to block 402 after resetting the iteration count to zero (block 412). The sets of sequential instructions are sequentially executed as the monitored CPU 21 follows the first execution of a first set of sequential instructions (initiated with an initial "computed" value) with sequential executions of the sequential instructions, in which all the runs are initiated by a different computed value, thereby sequentially executing sets of sequential instructions. In some embodiments, the monitoring system 11 waits for a predetermined time before returning from block 412 to block 402. In some embodiments, the monitoring system 11 waits for a predetermined time before proceeding from block 410 to block 412.

In this manner, the monitored CPU 20 executes a set of sequential instructions a first time based on an initial computed value (retrieved from a memory) to generate a final computed result, X-ORs (compares) the final computed result with a translation value from a translation table 129 that corresponds to an iteration count to generate a resulting-computed value and sends the resulting-computed value to the monitoring portion. If no reset is received from the monitoring portion 200, the monitored CPU 20 executes a set of sequential instructions a second (next) time based the final computed result to generate a second (next) final computed result, the second (next) final computed result being used in the succeeding execution of a set of sequential instructions, X-Ors (compares) the second (next) final computed result with a translation value from a translation table 129 that corresponds to an iteration count to generate a second (next) resulting-computed value and sends the next resulting-computed value to the monitoring portion. The monitored CPU 20 counts iterations of executions until a last device port is reached, resets the iteration count to zero, and terminates execution of sets of sequential instructions or begins a new execution of the sets of sequential instructions.

In one implementation of this embodiment described with reference to method 500 of FIG. 5, the sets of sequential instructions are subsets of a set of sequential instructions and each subset of the set of sequential instructions uses a different (preselected) seed value at the start of execution of the respective subset of the set of sequential instructions. This implementation can be used if a lack of throughput makes it impractical to perform a test on the entire set of sequential instructions every time. If the test is too large to execute in its entirety, the test is split the test into N subsets and each of the N subsets generates a computed value based on an independent seed value. A first seed value (initial value) is selected to be used in a first run of the set of sequential instructions (block 502). The first seed value is selected from a set of initial values in a lookup table 127. Starting with the first seed value, all pertinent CPU instructions for a subset of the set of sequential instructions are exercised (block 504). A subset-computed result is generated responsive to the execution of the subset set of sequential instructions. The subset-computed result is X-ORed with a translation value that corresponds with the selected seed value (block 506), which, for the first execution of a subset of the set of sequential instructions, is the first seed value. The output from the X-ORing of the subset-computed result with a translation value in the translation table 126 is a resulting-subset-computed value. In one implementation of this embodiment, block 506 does not occur and the subset-computed result is sent to the monitoring portion 201 and the flow proceeds to block 510.

The resulting-subset-computed value is sent to a monitoring device port (i.e., $i^{th}$ port 320-$i$ of the monitoring portion 201 of the monitoring device 31) that corresponds to the selected seed value (block 508). In this manner, as the monitoring system 11 loops through iterations of this method 500, each resulting-subset-computed value is sequentially written in addresses 320 in the hardware portion 227 of the high-integrity-processor monitor system as is described in detail below with reference to method 600 of FIG. 6.

The monitored CPU 21 determines if the last device port has been reached (block 510). When the last device port is reached, the flow of method 500 proceeds to block 502 and the process of method 500 is repeated at the monitored CPU 21 of the monitoring system 11. If the last device port has not been reached the flow of method 500 proceeds to block 512. The next seed value is selected from the lookup table 127 and the monitored CPU 21 is prepared to execute the next subset of the set of sequential instructions (block 512). The flow proceeds to block 504 and starting with the second seed value (or the next seed value) the flow cycles through blocks 504 to 512 until the last device port is reached and then the flow goes back to block 502. In some embodiments, the monitoring system 11 waits for a predetermined time before returning from block 510 to block 502. In some embodiments, the monitoring system 11 waits for a predetermined time before proceeding from block 510 to block 512.

In this manner, the monitored CPU 21 follows the first execution of the first subset of the set of sequential instructions with sequential executions of the subsets of the set of sequential instructions that each use a different seed value. In one implementation of this embodiment, the process is repeated so that the subsets in the set of sequential instructions are each executed with different seed values a plurality of times. In another implementation of this embodiment, the process is repeated so that the subsets of the set of sequential instructions are each executed once while the set of sequential instructions is executed with different seed values in different subsets of the set of sequential instructions.

In this manner, the monitored CPU 21 selects a first initial value from a set of initial values in a lookup table, executes a first subset of a set (or of sets) of sequential instructions based on the first initial value to generate a subset-computed result, X-ORs (compares) the subset-computed result with a translation value in a translation table 129 that corresponds to the first initial value to generate a resulting-subset-computed value, and sends the resulting-subset-computed value to the monitoring portion. The monitored CPU 20 then selects a second (next) initial value from the set of initial values in the lookup table, executes a second (next) subset of the set of sequential instructions based the second (next) initial value to generate a second (next) subset-computed result, X-ORs the next subset-computed result with a translation value that corresponds to the second (next) initial value to generate a next resulting-subset-computed value, and sends the next resulting-subset-computed value to the monitoring portion. The monitored CPU 20 terminates execution of sets of sequential instructions, when a last device port is reached.

Figure 6:
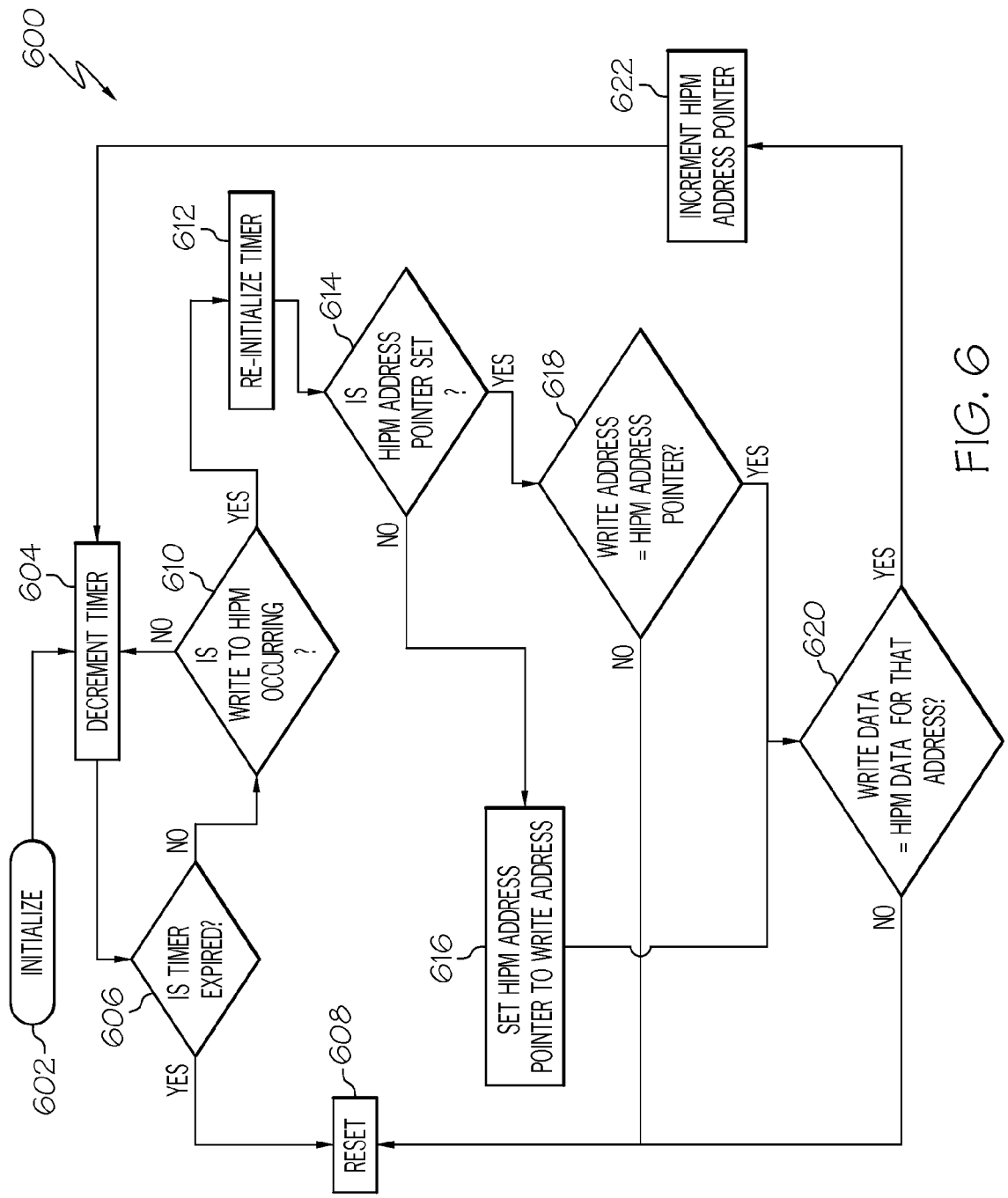
FIG. 6 is a flow diagram of a method of operating the monitoring device in accordance with the present invention.

FIG. 6 is a flow diagram of a method 600 of operating the monitoring device 30 in accordance with the present invention. The method 600 is described with reference to the high-integrity-processor monitor system 11 of FIG. 2, although it is to be understood that method 600 can be implemented using other embodiments of the high-integrity-processor monitor system as is understandable by one skilled in the art who reads this document. Initially after power-up the monitoring system 10 is initialized (block 602). A timer is decremented (block 604) and the monitoring portion 201 determines if the timer is expired (block 606). If the timer 256 is expired, the flow proceeds to block 608, and the monitored CPU 21 is reset (block 608). If the timer 256 is not expired, the flow proceeds to block 610. The monitoring portion 201 determines if a high-integrity-processor monitor write is occurring (block 610). If a high-integrity-processor monitor write is not occurring, the timer is decremented (block 604). A check is performed to ensure a minimum time has passed since the last write. If the minimum time has passed and the maximum time has not passed, and a high-integrity-processor monitor write is occurring, the timer 256 is re-initialized (block 612). The monitoring portion 201 determines if the HIPM address pointer was set (block 614). If the HIPM address pointer is not yet set and this is the first processor write to the HIPM since the last power-up or reset, the HIPM address pointer is set to the processor write address (block 616) and the flow proceeds to block 620. If the HIPM address pointer was set, the hardware HIPM verifies that the processor address equals the next sequential HIPM address (block 618), based on the last processor write to the HIPM. If the processor address is not the expected address, the HIPM issues a hardware reset (block 608).

If the processor address is the expected address, the HIPM verifies that the processor data equals the data expected by the hardware HIPM pertaining to that address (block 620). If the processor data does not match the expected data, the HIPM issues a hardware reset (block 608). A central processing unit reset is sent to the CPU 21. If the correct computed value was written to the correct address in a correct sequence within an allotted time frame the flow proceeds to block 622. The address pointer of the hardware HIPM is then incremented to point to the next expected processor write address and its corresponding data value (block 622) and the time is decremented (block 604). The hardware then waits for the next processor write to the HIPM (block 610).

If desired, the HIPM can be designed to have the address pointer preset, in which case software must start with the same preset address. The HIPM hardware 227 (FIG. 2) waits until a processor access is identified as a write to the HIPM address range (block 610). In one implementation of this embodiment, each correctly computed value is sequentially written in addresses (ports) in the hardware portion 227 of the high-integrity-processor monitor system 11. In another implementation of this embodiment, the first, second, and third computed values are sequentially written to the first register 320-1, the second register 320-2, and the third register 320-3, respectively.

In this manner, the sequence-value-timing detection logic 235 determines if a correct computed value was written to the correct address in a correct sequence within an allotted time frame with each test of the pertinent addressing modes, oper- and sizes, and instruction side-effects for each instruction tested. The CPU reset is sent to the monitored CPU 21 when a computed value was written to an address outside of the allotted time frame. In yet another implementation of this embodiment, the CPU reset is sent to the monitored CPU 21 when at least two computed values were written to at least two respective addresses (i.e., at least two respective registers 320-$j$ and 320-$(j+1)$) in an incorrect sequence.

In one implementation of this embodiment, the timer (e.g., timer 256) in the HIPM hardware ensures that the software writes occur at regular windowed intervals. In another implementation of this embodiment, a separate watchdog timer in hardware that software can strobe is included in the system. Either option ensures proper processor execution timing.

In this manner the monitoring portion 200 sequentially writes the sequence of the plurality of computed values at a port, determines if a correct computed value was written to the correct address in a correct sequence (and in some embodiments, within an allotted time frame) with each test of the pertinent addressing modes, operand sizes, and instruction side-effects for each instruction tested, and sends a central processing unit reset to the monitored central processing unit if sequentially writing the sequence of the plurality of computed values includes: writing incorrect computed values in the correct order; writing correct computed values in an incorrect order; or writing incorrect computed values in the incorrect order.

Embodiments of the high-integrity-processor monitor systems described herein test the software and the hardware of the monitored CPU without complex, expensive interfaces that need to be updated when the software in the high-integrity-processor monitor system changes.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of monitoring a high-integrity processor in a monitored central processing unit of a high integrity processor monitor system, the method comprising:
   executing a set of sequential instructions a plurality of times, each of the plurality of executions being based on a unique initial value that is obtained from a set of unique initial values stored in the monitored central processing unit or determined by a previous execution of the set of sequential instructions, and wherein executions of the set of sequential instructions a plurality of times test pertinent addressing modes, operand sizes, and instruction side-effects for each instruction tested in the monitored central processing unit;
   generating a computed final value responsive to each of the plurality of executions of the set of sequential instructions; and
   sending a computed final value to a monitoring portion of the high integrity processor monitor system responsive to the generating the computed final value for each of the plurality of executions of the set of sequential instructions, wherein the monitored central processing unit is independent of input from the monitoring portion between obtaining the unique initial value and sending the computed final value.

2. The method of claim 1, wherein executing the set of sequential instructions a plurality of times, each of the plurality of executions being based on the unique initial value comprises:
   executing the set of sequential instructions a first time based on an initial computed value to generate a final computed result; and
   executing the set of sequential instructions a next time based on the final computed result to generate a next final computed result, the next final computed result being used in a succeeding execution of a set of sequential instructions.

3. The method of claim 2, further comprising counting iterations of the plurality of executions.

4. The method of claim 3, further comprising:
   X-ORing the final computed result with a translation value that corresponds to an iteration count to generate a resulting-computed value; and
   X-ORing the next final computed result with the translation value that corresponds to the iteration count to generate a next resulting-computed value.

5. The method of claim 4, wherein sending the computed final value to the monitoring portion of the high integrity processor monitor system comprises:
   sending the resulting-computed value to the monitoring portion; and
   sending the next resulting-computed value to the monitoring portion.

6. The method of claim 2, wherein sending the computed final value to the monitoring portion of the high integrity processor monitor system comprises:
   sending the computed final result to the monitoring portion; and
   sending the next final computed result to the monitoring portion.

7. The method of claim 1, wherein executing the set of sequential instructions a plurality of times, each of the plurality of executions being based on the unique initial value comprises:
   selecting a first initial value from a set of initial values;
   executing the set of sequential instructions a first time based on the first initial value to generate a final computed result;
   selecting a next initial value from the set of initial values; and
   executing the set of sequential instructions a next time based on the next initial value to generate a next final computed result.

8. The method of claim 7, wherein sending the computed final value to the monitoring portion of the high integrity processor monitor system comprises:
   sending the final computed result to the monitoring portion; and
   sending the next final computed result to the monitoring portion.

9. The method of claim 7, further comprising:
   X-ORing the final computed result with a translation value that corresponds to the first initial value to generate a resulting-computed value; and
   X-ORing the next final computed result with the translation value that corresponds to the next initial value to generate a next resulting-computed value.

10. The method of claim 9, wherein sending the computed final value to the monitoring portion of the high integrity processor monitor system comprises:
    sending the resulting-computed value to the monitoring portion; and
    sending the next resulting-computed value to the monitoring portion.

11. The method of claim 1, wherein executing the set of sequential instructions a plurality of times, each of the plurality of executions being based on the unique initial value comprises:
    selecting a first initial value from a set of initial values in a lookup table;
    executing a first subset of the set of sequential instructions based on the first initial value to generate a subset-computed result;
    X-ORing the subset-computed result with a translation value that corresponds to the first initial value to generate a resulting-subset-computed value;
    sending the resulting-subset-computed value to the monitoring portion;
    selecting a next initial value from the set of initial values in the lookup table;

executing a next subset of the set of sequential instructions based on the next initial value to generate a next subset-computed result;

X-ORing the next subset-computed result with the translation value that corresponds to the next initial value to generate a next resulting-subset-computed value; and sending the next resulting-subset-computed value to the monitoring portion.

12. The method of claim 1, the method further comprising:

sequentially writing a sequence of the plurality of computed final values at a monitoring portion;

determining if a correct computed final value was written to a correct address in a correct sequence with each of the plurality of tests of the pertinent addressing modes, operand sizes, and instruction side-effects for each instruction tested; and sending a central processing unit reset to the monitored central processing unit if sequentially writing the sequence of the plurality of computed values includes: writing incorrect computed values in the correct order; writing correct computed values in an incorrect order or writing incorrect computed values in the incorrect order.

13. The method of claim 1, the method further comprising terminating execution of the set of sequential instructions, when a last device port is reached.

14. A method of monitoring a high-integrity processor in a monitored central processing unit of a high integrity processor monitor system, the method comprising:

receiving a plurality of computed values at a monitoring portion of the high integrity processor monitor system from the monitored central processing unit, the plurality of computed values based on executions of a set of sequential instructions a plurality of times, each of the plurality of executions being based on a unique initial value that is obtained from a set of unique initial values stored in the monitored central processing unit or determined by a previous execution of the set of sequential instructions, wherein the monitored central processing unit is independent of input from the monitoring portion between obtaining the unique initial value and a sending of a computed value;

sequentially writing a sequence of the plurality of computed values at the monitoring portion;

determining if a correct computed value was written to a correct address in a correct sequence for the plurality of executions of the set of sequential instructions to test pertinent addressing modes, operand sizes, and instruction side-effects for each instruction tested; and sending a central processing unit reset to the monitored central processing unit if sequentially writing the sequence of the plurality of computed values includes: writing incorrect computed values in the correct order; writing correct computed values in an incorrect order or writing incorrect computed values in the incorrect order.

15. The method of claim 14, further comprising determining if a correct computed value was written to the correct address within an allotted time frame for the plurality of executions of the set of sequential instructions.

16. A high-integrity-processor monitoring system comprising:

a monitored central processing unit including programmable processor integrity software in a first storage medium, the programmable processor integrity software configured to execute a set of sequential instructions a plurality of times to test pertinent addressing modes, operand sizes, and instruction side-effects for each instruction tested, wherein each of the plurality of executions of the set of sequential instructions is based on a unique initial value that is obtained from a set of unique initial values stored in the monitored central processing unit or determined by a previous execution of the sequential instructions, and each of the plurality of executions of the set of sequential instructions generates a computed value; and a monitoring portion including software/firmware in a second storage medium, the software/firmware configured to sequentially receive the computed value generated at each of the plurality of executions of the set of sequential instructions and to determine if correct computed values were received in a correct order, wherein the monitored central processing unit is independent of input from the monitoring portion between obtaining the unique initial value and generating the computed value.

17. The high-integrity-processor monitoring system of claim 16, further comprising a programmable logic device in the monitoring portion of the high-integrity-processor monitor, the programmable logic device including a series of registers in the software/firmware in a second storage medium.

18. The high-integrity-processor monitoring system of claim 16, further comprising a lookup table for unique initial values in the monitored central processing unit.

19. The high-integrity-processor monitoring system of claim 16, further comprising:

sequence-value-timing detection logic stored in the second storage medium, the sequence-value-timing detection logic operable to output instructions to reset the monitored central processing unit when the sequence of the computed values received at the monitoring portion of the high-integrity-processor monitor includes at least one of: incorrect computed values in the correct order; correct computed values in an incorrect order; incorrect computed values in the incorrect order; and the correct computed values in the correct order outside of an allotted time frame.

20. The high-integrity-processor monitoring system of claim 16, wherein the computed value is a final computed value, the system further comprising:

a translation table value in the monitored central processing unit, the translation table including translation values for each unique initial value, wherein the translation values are X-ORed with the final computed values to generate a resulting-computed value, wherein the resulting-computed value is sent to the monitoring portion.

* * * * *